(12) United States Patent
Ito

(10) Patent No.: US 6,801,339 B1
(45) Date of Patent: Oct. 5, 2004

(54) IMAGE PROCESSING METHOD AND APPARATUS

(75) Inventor: Wataru Ito, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 09/276,470

(22) Filed: Mar. 25, 1999

(30) Foreign Application Priority Data

| Mar. 26, 1998 | (JP) | ............................................. 10-078628 |
| Mar. 26, 1998 | (JP) | ............................................. 10-078629 |
| Mar. 26, 1998 | (JP) | ............................................. 10-078630 |

(51) Int. Cl.$^7$ .......................... H04N 1/409; G06T 5/00
(52) U.S. Cl. ...................... 358/3.26; 358/3.27; 358/1.2; 382/254; 382/266; 382/275; 382/300
(58) Field of Search ................................ 382/266, 261, 382/254, 263, 260, 299, 300; 358/3.26, 3.27, 1.2, 1.9

(56) References Cited

U.S. PATENT DOCUMENTS

| 4,783,840 A | * | 11/1988 | Song ........................... 382/261 |
| 5,038,388 A | * | 8/1991 | Song ........................... 382/266 |
| 5,327,257 A | * | 7/1994 | Hrytzak et al. ............. 382/254 |
| 5,641,596 A | * | 6/1997 | Gray et al. .................. 382/254 |
| 5,739,922 A | * | 4/1998 | Matama ....................... 382/254 |
| 5,774,601 A | * | 6/1998 | Mahmoodi ................... 382/298 |
| 5,907,642 A | * | 5/1999 | Ito ............................. 382/274 |
| 5,933,540 A | * | 8/1999 | Lakshminarayanan et al. ........................... 382/260 |
| 5,982,951 A | * | 11/1999 | Katayama et al. ........... 382/284 |
| 6,014,469 A | * | 1/2000 | Eschbach ..................... 382/261 |
| 6,091,861 A | * | 7/2000 | Keyes et al. ................. 382/299 |
| 6,097,847 A | * | 8/2000 | Inoue .......................... 382/266 |
| 6,115,078 A | * | 9/2000 | Kino ........................... 382/254 |
| 6,118,906 A | * | 9/2000 | Keyes et al. ................. 382/266 |
| 6,385,347 B1 | * | 5/2002 | Matsuda ...................... 382/263 |

FOREIGN PATENT DOCUMENTS

| JP | 01158876 A | * 6/1989 | ............ H04N/1/40 |
| JP | 6350989 | 12/1994 | |
| JP | 6350990 | 12/1994 | |
| JP | 723228 | 1/1995 | |
| JP | 723229 | 1/1995 | |
| JP | 779350 | 3/1995 | |
| JP | 8214165 | 8/1996 | |
| JP | 9214967 | 8/1997 | |

OTHER PUBLICATIONS

Kamesware Rao Namuduri et al., "Scale based approach for image quality evaluation", SPIE vol. 3308, pp. 36–43, Jan. 30, 1998.*

Olivier Rioul et al., "Wavelets and Signal Processing," IEEE SP Magazine, pp. 14–38, Oct. 1991.

Stephane Mallat, "Zero–Crossings of a Wavelet Transform," IEEE Transactions on Information Theory, vol. 37, No. 4, pp. 1019–1033, Jul. 1991.

* cited by examiner

Primary Examiner—Scott Rogers
(74) Attorney, Agent, or Firm—Birch, Stewart, Kolasch & Birch, LLP

(57) ABSTRACT

In an image processing method, wherein image processing is carried out on an original image signal representing an original image, graininess and/or sharpness of the original image is estimated in accordance with the original image signal. The image processing is then carried out on the original image signal and in accordance with the graininess and/or the sharpness having been estimated, and a processed image signal is thereby obtained. The image processing optimum for an image can thereby be carried out regardless of graininess and/or sharpness of the image.

6 Claims, 7 Drawing Sheets

IMAGE PROCESSING METHOD AND APPARATUS

BACKGROUND OF THE INVENTION

1. Field of the Invention

This invention relates to an image processing method and apparatus for carrying out image processing on an image signal. This invention also relates to an image composing method and system for composing an image from a plurality of images. This invention further relates to an image sharpness estimating method and device for estimating graininess of an image. This invention still further relates to an image sharpness estimating method and device for estimating sharpness of an image.

2. Description of the Prior Art

Techniques for obtaining an image signal, which represents an image, carrying out appropriate image processing on the image signal, and reproducing a visible image from the processed image signal have heretofore been carried out in various fields. An image output device for reproducing the image carries out image processing, such as correction of the image signal, in accordance with characteristics of an image input apparatus, which is connected to the image output device in a system, and characteristics of the image output device and reproduces the image from the processed image signal. In cases where only one image input apparatus is connected to the image output device, the image output device may carry out the image processing corresponding to the characteristics of the image input apparatus. In cases where a plurality of image input apparatuses are connected to the image output device, the image output device may carry out the image processing corresponding to the characteristics of each of the image input apparatuses.

However, in cases where a plurality of image input apparatuses are connected to an image output device, it often occurs that the image input apparatuses are altered, and it cannot be specified which image signal having been fed into the image output device is the one obtained from which image input apparatus. Therefore, it is difficult to carry out optimum image processing such that the details of the image processing may correspond to the characteristics of each of the image input apparatuses. Accordingly, an image processing apparatus has been proposed in, for example, Japanese Patent No. 2,660,170, wherein image signals having been received from image input apparatuses are converted into image signals having general-purpose gradation, and wherein only the output characteristics are corrected in an image output device such that an appropriate reproduced image may be obtained.

Also, images obtained from image input apparatuses have graininess characteristics (i.e., the state of noise components) and sharpness characteristics varying in accordance with the image input apparatuses. Therefore, ordinarily, image processing, such as smoothing processing or sharpness enhancement processing, is carried on the obtained image signal and in accordance with the graininess characteristics and/or the sharpness characteristics of the image input apparatus, from which the image signal has been obtained, such that an image having good image quality may be reproduced. Further, when an image is reproduced, image size enlargement or reduction is often carried out by carrying out an interpolating operation on an image signal. In such cases, an interpolating operation (e.g., a cubic spline interpolating operation), which attaches importance to sharpness, or an interpolating operation (e.g., a B spline interpolating operation), which attaches importance to smoothness, is carried out in accordance with the graininess characteristics and/or the sharpness characteristics of the image input apparatus, from which the image signal has been obtained.

As a technique for processing an image signal, a multi-resolution transforming technique has heretofore been proposed. With the multi-resolution transforming technique, an original image is transformed in to multi-resolution images, each of which is of one of a plurality of different frequency bands, and predetermined processing is carried out on the image of each frequency band. Inverse multi-resolution transform is then carried out, and an ultimate processed image is thereby obtained. In such cases, the predetermined processing may be processing for separating high frequency components for noise removal, compression processing in which signal components of a frequency band containing much noise are reduced, or the like. As the multi-resolution transforming technique, a wavelet transform technique, a Laplacian pyramid technique, a Fourier transform technique, or the like, has been known. In particular, the wavelet transform is one of techniques for signal frequency analysis. The wavelet transform is advantageous over the Fourier transform, which has heretofore been used widely as the frequency analysis technique, in that a local change in a signal can be detected easily. Therefore, recently, the wavelet transform has attracted particular attention in the field of signal processing ("Wavelets and Signal Processing" by Olivier Rioul and Martin Vetterli, IEEE SP MAGAZINE, pp. 14–38, October 1991; "Zero-Crossings of a Wavelet Transform" by Stephane Mallat, IEEE TRANSACTIONS ON INFORMATION THEORY, Vol. 37, No. 4, pp. 1,019–1, 033, July 1991; Japanese Unexamined Patent Publication Nos. 6(1994)-350989, 6(1994)-350990, 7(1995)-23228, 7(1995)-23229, and 7(1995)-79350, and Japanese Patent Application No. 8(1996)-14510).

With rapid advances made in computer networks in recent years, various kinds of image input apparatuses are connected to an image output device, and image signals having been obtained from various kinds of processing are transferred through a network. Therefore, image signals are transferred in a state such that it may not be clear which image signal having been fed into the image output device is the one obtained from which image input apparatus, and such that it may not be clear whether image processing has or has not been carried out with respect to graininess, sharpness, or gradation of the image signal. In such cases, if the image processing apparatus proposed in Japanese Patent No. 2,660,170 is utilized, image processing can be carried out on image signals such that they may have general-purpose gradation regardless of the kinds of the image input apparatuses.

However, as for graininess (noise components) or sharpness of an image represented by an image signal, if it is not clear which image signal is the one having been obtained from which image input apparatus, image processing, such as smoothing processing, sharpness enhancement processing, or interpolating operation processing, which is optimum for the characteristics of the image input apparatus, cannot be carried out on the image signal. In such cases, it may be considered to carry out the same image processing with respect to graininess or sharpness on every image signal by utilizing one predetermined technique. However, the image processing cannot be optimum for every image, and there is the risk that, for example, an image has a high level of graininess, but the sharpness of the image is enhanced. Also, there is the risk that an unsharp image is obtained due to insufficient sharpness enhancement. Further, there is the risk that an image has a high level of sharpness, but the sharpness of the image is enhanced even further, resulting in an image having an artifact, such as overshooting or undershooting. Particularly, in cases where the technique described above is employed when an image is composed from a plurality of images and the composed image is reproduced, even if the image signals combined with one another have different graininess characteristics or different sharpness characteristics, the same image processing will be carried out on the image signals. Therefore, from the image composition, an image will be obtained, in which the balance of graininess or sharpness varies for different areas of the image and which gives an unnatural feeling. Also, it may be considered for the operator to view an image having been reproduced and to artificially correct the image signal. However, in such cases, considerable time and labor are required to make a correction, and the burden to the operator cannot be kept light.

SUMMARY OF THE INVENTION

The primary object of the present invention is to provide an image processing method, wherein image processing optimum for an image is capable of being carried out regardless of graininess and/or sharpness of the image.

Another object of the present invention is to provide an apparatus for carrying out the image processing method.

A further object of the present invention is to provide an image composing method, wherein image processing optimum for each of images, which are to be combined with one another, is capable of being carried out regardless of graininess and/or sharpness of each of the images.

A still further object of the present invention is to provide a system for carrying out the image composing method.

Another object of the present invention is to provide an image graininess estimating method, wherein graininess of an image is capable of being estimated from an image signal representing the image.

A further object of the present invention is to provide a device for carrying out the image graininess estimating method.

A still further object of the present invention is to provide an image sharpness estimating method, wherein sharpness of an image is capable of being estimated from an image signal representing the image.

Another object of the present invention is to provide a device for carrying out the image sharpness estimating method.

The present invention provides an image processing method, wherein image processing is carried out on an original image signal representing an original image, the method comprising the steps of:

i) estimating graininess and/or sharpness of the original image in accordance with the original image signal, and ii) carrying out the image processing on the original image signal and in accordance with the graininess and/or the sharpness having been estimated, a processed image signal being thereby obtained.

In the image processing method in accordance with the present invention, the image processing should preferably be one of interpolating operation processes, which yield interpolation images having different levels of sharpness and each of which is set in accordance with the graininess and/or the sharpness having been estimated. Also, the image processing should preferably be one of sharpness enhancing processes, which enhance sharpness with different degrees of enhancement and each of which is set in accordance with the graininess and/or the sharpness having been estimated.

By way of example, the interpolating operation processes, which yield interpolation images having different levels of sharpness, may be a cubic spline interpolating operation process, which attaches importance to sharpness, and a B spline interpolating operation process, which attaches importance to smoothness.

The present invention also provides an image composing method, wherein a plurality of original image signals representing a plurality of images are combined with one another, and a composed image signal is thereby obtained, the method comprising the steps of:

i) carrying out image processing on each of the original image signals and with the image processing method in accordance with the present invention, a plurality of processed image signals being thereby obtained, and ii) combining the plurality of the processed image signals, the composed image signal being thereby obtained.

The present invention further provides an image processing apparatus, wherein image processing is carried out on an original image signal representing an original image, the apparatus comprising:

i) an estimating means for estimating graininess and/or sharpness of the original image in accordance with the original image signal, and ii) an image processing means for carrying out the image processing on the original image signal and in accordance with the graininess and/or the sharpness having been estimated, and thereby obtaining a processed image signal.

In the image processing apparatus in accordance with the present invention, the image processing, which is carried out by the image processing means, should preferably be one of interpolating operation processes, which yield interpolation images having different levels of sharpness and each of which is set in accordance with the graininess and/or the sharpness having been estimated. Also, the image processing, which is carried out by the image processing means, should preferably be one of sharpness enhancing processes, which enhance sharpness with different degrees of enhancement and each of which is set in accordance with the graininess and/or the sharpness having been estimated.

The present invention still further provides an image composing system, wherein a plurality of original image signals representing a plurality of images are combined with one another, and a composed image signal is thereby obtained, the system comprising:

i) means for carrying out image processing on each of the original image signals and with the image processing apparatus in accordance with the present invention, and thereby obtaining a plurality of processed image signals, and ii) an image composing means for combining the plurality of the processed image signals, and thereby obtaining the composed image signal.

The present invention also provides an image graininess estimating method, comprising the steps of:

i) transforming an original image signal, which represents an original image, into a multi-resolution space, the original image signal being thereby decomposed into image signals representing images, each of which is of one of a plurality of different frequency bands, ii) comparing a pixel value of each of pixels in a low frequency band image and a predetermined threshold value with each other, the low frequency band image being of a frequency band lower than the frequency band of the highest frequency band image, which is of the highest frequency band, among the images of the plurality of the different frequency bands, iii) calculating a variance value of pixel values of pixels in the highest frequency band image, which correspond to the pixels in the low frequency band image that have been found to have values smaller than the predetermined threshold value, and iv) estimating graininess of the original image in accordance with the variance value.

The term "low frequency band image" as used herein means the image of the frequency band lower by one stage than the frequency band of the highest frequency band image, or the image of the frequency band lower by at least two stages than the frequency band of the highest frequency band image.

The term "in accordance with a variance value" as used herein means that the estimation is made in accordance with the level of the variance value.

In the image graininess estimating method in accordance with the present invention, the transform into the multi-resolution space, the comparison with the predetermined threshold value, and the calculation of the variance value should preferably be carried out with respect to only a region selected in the original image.

The selected region may be a center region of the image, which region has a high possibility of containing a major object pattern, or may be an arbitrary region in the image.

Also, in the image graininess estimating method in accordance with the present invention, the transform into the multi-resolution space should preferably be carried out with wavelet transform. Alternatively, the transform into the multi-resolution space may be carried out with one of other multi-resolution transform techniques, such as the Laplacian pyramid technique and the Fourier transform technique.

Ordinarily, in the multi-resolution transform techniques, such as the wavelet transform, pixels are thinned out each time the transform is carried out, and therefore an image having a size reduced from the size of the original image is obtained as the frequency band becomes low. However, in the image graininess estimating method in accordance with the present invention, the transform into the multi-resolution space should preferably be carried out such that the pixels in the images of the plurality of the different frequency bands may not be thinned out.

The present invention further provides an image graininess estimating device, comprising:

i) a multi-resolution transforming means for transforming an original image signal, which represents an original image, into a multi-resolution space, and thereby decomposing the original image signal into image signals representing images, each of which is of one of a plurality of different frequency bands, ii) a comparison means for comparing a pixel value of each of pixels in a low frequency band image and a predetermined threshold value with each other, the low frequency band image being of a frequency band lower than the frequency band of the highest frequency band image, which is of the highest frequency band, among the images of the plurality of the different frequency bands, iii) a variance value calculating means for calculating a variance value of pixel values of pixels in the highest frequency band image, which correspond to the pixels in the low frequency band image that have been found to have values smaller than the predetermined threshold value, and iv) an estimating means for estimating graininess of the original image in accordance with the variance value.

In the image graininess estimating device in accordance with the present invention, the multi-resolution transforming means, the comparison means, and the variance value calculating means, respectively, should preferably carry out the transform into the multi-resolution space, the comparison with the predetermined threshold value, and the calculation of the variance value with respect to only a region selected in the original image.

Also, in the image graininess estimating device in accordance with the present invention, the multi-resolution transforming means should preferably carry out the transform into the multi-resolution space with wavelet transform.

Further, in the image graininess estimating device in accordance with the present invention, the multi-resolution transforming means should preferably carry out the transform into the multi-resolution space such that the pixels in the images of the plurality of the different frequency bands may not be thinned out.

The present invention still further provides an image sharpness estimating method, comprising the steps of:

i) transforming an original image signal, which represents an original image, into a multi-resolution space, the original image signal being thereby decomposed into image signals representing images, each of which is of one of a plurality of different frequency bands, ii) comparing a pixel value of each of pixels in a low frequency band image and a predetermined threshold value with each other, the low frequency band image being of a frequency band lower than the frequency band of the highest frequency band image, which is of the highest frequency band, among the images of the plurality of the different frequency bands, iii) calculating a ratio between a pixel value of a pixel in the low frequency band image, which pixel has been found to have a value larger than the predetermined threshold value, and the pixel value of the corresponding pixel in the highest frequency band image, and iv) estimating sharpness of the original image in accordance with the ratio.

In the image sharpness estimating method in accordance with the present invention, the low frequency band image may be the image of the frequency band lower by one stage than the frequency band of the highest frequency band image, or the image of the frequency band lower by at least two stages than the frequency band of the highest frequency band image.

The term "in accordance with a ratio" as used herein means that the estimation is made in accordance with the level of the ratio.

The image sharpness estimating method in accordance with the present invention should preferably be modified such that the transform into the multi-resolution space may be carried out by:

carrying out filtering processes, respectively, on the original image along each of a vertical direction and a horizontal direction, a vertical-direction high frequency/horizontal-direction low frequency image, a vertical-direction low frequency/horizontal-direction high frequency image, and a vertical- and horizontal-direction low frequency image being thereby obtained, carrying out filtering processes on the vertical- and horizontal-direction low frequency image, and repeating filtering processes successively on the vertical- and horizontal-direction low frequency images, which have been obtained from the previous filtering processes, vertical-direction high frequency/horizontal-direction low frequency images and vertical-direction low frequency/horizontal-direction high frequency images being thereby obtained, each of the vertical-direction high frequency/horizontal-direction low frequency images and each of the vertical-direction low frequency/horizontal-direction high frequency images being of one of the plurality of the different frequency bands, the comparison with the predetermined threshold value may be carried out with respect to each of the vertical-direction high frequency/horizontal-direction low frequency image and the vertical-direction low frequency/horizontal-direction high frequency image, which are of the low frequency band, and the ratio may be the ratio between a pixel value of a pixel in the vertical-direction high frequency/horizontal-direction low frequency image of the low frequency band, which pixel has been found to have a value larger than the predetermined threshold value, and the pixel value of the corresponding pixel in the highest frequency band image, or the ratio between a pixel value of a pixel in the vertical-direction low frequency/horizontal-direction high frequency image of the low frequency band, which pixel has been found to have a value larger than the predetermined threshold value, and the pixel value of the corresponding pixel in the highest frequency band image, whichever ratio has a larger value.

The term "repeating filtering processes successively on vertical- and horizontal-direction low frequency images having been obtained from previous filtering processes" as used herein means that the filtering processes are carried out on the vertical- and horizontal-direction low frequency image, which has been obtained each time the previous filtering processes have been carried out.

In the image sharpness estimating method in accordance with the present invention, the transform into the multi-resolution space, the comparison with the predetermined threshold value, and the calculation of the ratio should preferably be carried out with respect to only a region selected in the original image.

The selected region may be a center region of the image, which region has a high possibility of containing a major object pattern, or may be an arbitrary region in the image.

Also, in the image sharpness estimating method in accordance with the present invention, the transform into the multi-resolution space should preferably be carried out with wavelet transform. Alternatively, the transform into the multi-resolution space may be carried out with one of other multi-resolution transform techniques, such as the Laplacian pyramid technique and the Fourier transform technique.

Ordinarily, in the multi-resolution transform techniques, such as the wavelet transform, pixels are thinned out each time the transform is carried out, and therefore an image having a size reduced from the size of the original image is obtained as the frequency band becomes low. However, in the image sharpness estimating method in accordance with the present invention, the transform into the multi-resolution space should preferably be carried out such that the pixels in the images of the plurality of the different frequency bands may not be thinned out.

The present invention also provides an image sharpness estimating device, comprising:

i) a multi-resolution transforming means for transforming an original image signal, which represents an original image, into a multi-resolution space, the original image signal being thereby decomposed into image signals representing images, each of which is of one of a plurality of different frequency bands, ii) a comparison means for comparing a pixel value of each of pixels in a low frequency band image and a predetermined threshold value with each other, the low frequency band image being of a frequency band lower than the frequency band of the highest frequency band image, which is of the highest frequency band, among the images of the plurality of the different frequency bands, iii) a ratio calculating means for calculating a ratio between a pixel value of a pixel in the low frequency band image, which pixel has been found to have a value larger than the predetermined threshold value, and the pixel value of the corresponding pixel in the highest frequency band image, and iv) an estimating means for estimating sharpness of the original image in accordance with the ratio.

The image sharpness estimating device in accordance with the present invention should preferably be modified such that the multi-resolution transforming means may carry out the transform into the multi-resolution space by:

carrying out filtering processes, respectively, on the original image along each of a vertical direction and a horizontal direction, a vertical-direction high frequency/horizontal-direction low frequency image, a vertical-direction low frequency/horizontal-direction high frequency image, and a vertical- and horizontal-direction low frequency image being thereby obtained, carrying out filtering processes on the vertical- and horizontal-direction low frequency image, and repeating filtering processes successively on the vertical- and horizontal-direction low frequency images, which have been obtained from the previous filtering processes, vertical-direction high frequency/horizontal-direction low frequency images and vertical-direction low frequency/horizontal-direction high frequency images being thereby obtained, each of the vertical-direction high frequency/horizontal-direction low frequency images and each of the vertical-direction low frequency/horizontal-direction high frequency images being of one of the plurality of the different frequency bands, the comparison means may carry out the comparison with the predetermined threshold value with respect to each of the vertical-direction high frequency/horizontal-direction low frequency image and the vertical-direction low frequency/horizontal-direction high frequency image, which are of the low frequency band, and the ratio calculating means may calculate, as the ratio, the ratio between a pixel value of a pixel in the vertical-direction high frequency/horizontal-direction low frequency image of the low frequency band, which pixel has been found to have a value larger than the predetermined threshold value, and the pixel value of the corresponding pixel in the highest frequency band image, or the ratio between a pixel value of a pixel in the vertical-direction low frequency/horizontal-direction high frequency image of the low frequency band, which pixel has been found to have a value larger than the predetermined threshold value, and the pixel value of the corresponding pixel in the highest frequency band image, whichever ratio has a larger value.

In the image sharpness estimating device in accordance with the present invention, the multi-resolution transforming means, the comparison means, and the ratio calculating means, respectively, should preferably carry out the transform into the multi-resolution space, the comparison with the predetermined threshold value, and the calculation of the ratio with respect to only a region selected in the original image.

Also, in the image sharpness estimating device in accordance with the present invention, the multi-resolution transforming means should preferably carry out the transform into the multi-resolution space with wavelet transform.

Further, in the image sharpness estimating device in accordance with the present invention, the multi-resolution transforming means should preferably carry out the transform into the multi-resolution space such that the pixels in the images of the plurality of the different frequency bands may not be thinned out.

With the image processing method and apparatus in accordance with the present invention, graininess and/or sharpness of the original image is estimated in accordance with the original image signal, and the image processing is carried out on the original image signal and in accordance with the graininess and/or the sharpness having been estimated. Therefore, by the utilization of the results of estimation of graininess and/or sharpness, a smoothing process, a sharpness enhancing process, an interpolating operation process, or the like, can be carried out on the original image signal and in accordance with the graininess and/or the sharpness of the original image. For example, in cases where it has been estimated that the level of graininess is high, a smoothing process for reducing the graininess can be carried out on the original image signal or, when an interpolating operation is to be carried out, the B spline interpolating operation process, which attaches importance to smoothness, can be carried out on the original image signal. In cases where it has been estimated that the level of graininess is low, no smoothing process may be carried out on the original image signal or, when an interpolating operation is to be carried out, the cubic spline interpolating operation process, which attaches importance to sharpness, can be carried out on the original image signal. Also, a sharpness enhancing process can be carried out such that the sharpness may be less enhanced at an area in the original image, which has been estimated as having a high level of sharpness, and such that the sharpness may be more enhanced at an area in the original image, which has been estimated as having a low level of sharpness. Further, in cases where it has been estimated that the level of sharpness is high in the entire area of the original image and image size enlargement or reduction is to be carried out, the B spline interpolating operation process, which attaches importance to smoothness, can be carried out on the original image signal. In cases where it has been estimated that the level of sharpness is low in the entire area of the original image and image size enlargement or reduction is to be carried out, the cubic spline interpolating operation process, which attaches importance to sharpness, can be carried out on the original image signal. Accordingly, even if it is not clear which image signal representing an original image is the one having been obtained from which image input apparatus, and even if it is not clear whether the received image signal has or has not been subjected to image processing, the image processing with respect to graininess and/or sharpness, which image processing is optimum for the original image, can be carried out.

With the image composing method and system in accordance with the present invention, the image processing is carried out on each of a plurality of original image signals and with the image processing method and apparatus in accordance with the present invention, and a plurality of processed image signals are thereby obtained. The plurality of the processed image signals are then combined with one another, and the composed image signal is thereby obtained. Therefore, the composed image signal can be obtained from the processed image signals, each of which has been obtained from the optimum image processing having been carried out in accordance with the graininess and/or the sharpness of the original image. Accordingly, the problems can be prevented from occurring in that, in cases where the same image processing is carried out on all of the original image signals to be combined, an image is obtained, in which the balance of graininess or sharpness varies for different areas of the image. As a result, a composed image can be obtained, which gives a natural feeling.

With the image graininess estimating method and device in accordance with the present invention, the original image signal is firstly transformed into a multi-resolution space by utilizing the wavelet transform, or the like, and the original image signal is thereby decomposed into image signals representing images, each of which is of one of a plurality of different frequency bands. Thereafter, the pixel value of each of pixels in the low frequency band image and the predetermined threshold value are compared with each other, the low frequency band image being of a frequency band lower than the frequency band of the highest frequency band image among the images of the plurality of the different frequency bands. A boundary line, such as an edge, which is embedded in the original image, has a large pixel value. The pixel value of the boundary line is large also in the highest frequency band image and the low frequency band image. Also, as in the boundary line, a grainy component (a noise component) contained in the original image has a large pixel value. The pixel value of the grainy component is large also in the highest frequency band image. However, in the low frequency band image, the grainy component, which constitutes a high frequency component of the original image, has been removed, and therefore the pixel value of the pixel corresponding to the grainy component is comparatively small. Therefore, in accordance with the results of comparison made between the pixel value of each of pixels in the low frequency band image and the predetermined threshold value, the pixels in the highest frequency band image, which correspond to the pixels in the low frequency band image that have been found to have values smaller than the predetermined threshold value, are regarded as the pixels having a possibility of containing grainy components. With respect to such pixels in the highest frequency band image, the variance value of the pixel values is calculated. In cases where grainy components are contained in a flat image area (i.e., an image area at which the signal values are approximately identical with one another), the variance value becomes large. In cases where little grainy component is contained in the flat image area, the variance value becomes small. Accordingly, the graininess of the original image can be estimated in accordance with the level of the variance value.

As described above, with the image graininess estimating method and device in accordance with the present invention, the graininess of the original image can be estimated from the original image signal representing the original image. Therefore, in an image processing apparatus, by the utilization of the results of estimation, a smoothing process, an interpolating operation process, or the like, in accordance with the estimated graininess can be carried out on the original image signal. For example, in cases where it has been estimated that the level of graininess is high, a smoothing process for reducing the graininess can be carried out on the original image signal or, when an interpolating operation is to be carried out, the B spline interpolating operation process, which attaches importance to smoothness, can be carried out on the original image signal. In cases where it has been estimated that the level of graininess is low, no smoothing process may be carried out on the original image signal or, when an interpolating operation is to be carried out, the cubic spline interpolating operation process, which attaches importance to sharpness, can be carried out on the original image signal. Accordingly, even if it is not clear which image signal representing an original image is the one having been obtained from which image input apparatus, and even if it is not clear whether the received image signal has or has not been subjected to image processing, the image processing with respect to graininess, which image processing is optimum for the original image, can be carried out.

Also, with the image graininess estimating method and device in accordance with the present invention, the transform into the multi-resolution space, the comparison with the predetermined threshold value, and the calculation of the variance value may be carried out with respect to only a region selected in the original image. In such cases, the amount of calculations can be kept small, and the estimation of graininess can be carried out quickly.

Further, with the image graininess estimating method and device in accordance with the present invention, the transform into the multi-resolution space may be carried out such that the pixels in the images of the plurality of the different frequency bands may not be thinned out. In such cases, the correspondence between the pixels in the low frequency band image and the pixels in the highest frequency band image can be set accurately.

With the image sharpness estimating method and device in accordance with the present invention, the original image signal is firstly transformed into a multi-resolution space by utilizing the wavelet transform, or the like, and the original image signal is thereby decomposed into image signals representing images, each of which is of one of a plurality of different frequency bands. Thereafter, the pixel value of each of pixels in the low frequency band image and the predetermined threshold value are compared with each other, the low frequency band image being of a frequency band lower than the frequency band of the highest frequency band image among the images of the plurality of the different frequency bands. An image area, such as an edge embedded in the original image, which serves as a reference in the estimation of sharpness of the original image, has a comparatively large pixel value. The pixel value of such an image area is large also in the low frequency band image. Conversely, if the pixel value of a pixel in the low frequency band image is small, it can be considered that an image area, such as an edge, which serves as a reference in the estimation of sharpness, is not present at the pixel. Therefore, in accordance with the results of comparison made between the pixel value of each of pixels in the low frequency band image and the predetermined threshold value, the pixel in the low frequency band image, which pixel has been found to have a value larger than the predetermined threshold value, is regarded as being a pixel serving as a reference in the estimation of sharpness. A calculation is made to find the ratio between the pixel value of the pixel in the low frequency band image, which pixel has been found to have a value larger than the predetermined threshold value, and the pixel value of the corresponding pixel in the highest frequency band image.

The highest frequency band image carries the highest frequency components of the original image, and therefore represents an amount of change in signal value in a comparatively narrow range. The low frequency band image carries the low frequency components of the original image, and therefore represents an amount of change in signal value in a range wider than in the highest frequency band image. For example, as illustrated in FIG. 5A, at an edge at which the signal value changes sharply, an amount of change in signal value $\Delta A$ in a narrow range A and an amount of change in signal value $\Delta B$ in a wide range B are identical with each other. Also, as illustrated in FIG. 5B, at an image area at which the change in signal value is not sharp, the frequency components are of a frequency band lower than that at the edge at which the signal value changes sharply, and therefore an amount of change in signal value $\Delta B$ in a wide range B becomes larger than an amount of change in signal value $\Delta A$ in a narrow range A. Accordingly, at the edge at which the signal value changes sharply as illustrated in FIG. 5A, the pixel corresponding to the edge area takes an approximately identical pixel value in the highest frequency band image and the low frequency band image. Also, at the image area at which the change in signal value is not sharp as illustrated in FIG. 5B, the pixel corresponding to the signal change position takes a larger pixel value in the low frequency band image than in the highest frequency band image.

Therefore, the ratio between the pixel value of the pixel in the low frequency band image and the pixel value of the corresponding pixel in the highest frequency band image takes a value close to 1 at the edge at which the signal value changes sharply, i.e. at an image area having a high level of sharpness. Also, the ratio takes a value deviated from 1 at an image area at which the change in signal value is not sharp, i.e. at an image area having a low level of sharpness. Accordingly, the sharpness of the original image can be estimated in accordance with the calculated value of the ratio.

As described above, with the image sharpness estimating method and device in accordance with the present invention, the sharpness of the original image can be estimated from the original image signal representing the original image. Therefore, in an image processing apparatus, by the utilization of the results of estimation, a sharpness enhancing process, an interpolating operation process, or the like, in accordance with the estimated sharpness can be carried out on the original image signal. For example, a sharpness enhancing process can be carried out such that the sharpness may be less enhanced at an area in the original image, which has been estimated as having a high level of sharpness, and such that the sharpness may be more enhanced at an area in the original image, which has been estimated as having a low level of sharpness. Further, in cases where it has been estimated that the level of sharpness is high in the entire area of the original image and image size enlargement or reduction is to be carried out, the B spline interpolating operation process, which attaches importance to smoothness, can be carried out on the original image signal. In cases where it has been estimated that the level of sharpness is low in the entire area of the original image and image size enlargement or reduction is to be carried out, the cubic spline interpolating operation process, which attaches importance to sharpness, can be carried out on the original image signal. Accordingly, even if it is not clear which image signal representing an original image is the one having been obtained from which image input apparatus, and even if it is not clear whether the received image signal has or has not been subjected to image processing, the image processing with respect to sharpness, which image processing is optimum for the original image, can be carried out.

With the image sharpness estimating method and device in accordance with the present invention, the transform into the multi-resolution space may be carried out by repeating the filtering processes along each of the vertical direction and the horizontal direction in the original image. Also, the comparison between the pixel value of each pixel and the predetermined threshold value may be carried out with respect to each of the vertical-direction high frequency/ horizontal-direction low frequency image and the vertical-direction low frequency/horizontal-direction high frequency image, which are of the low frequency band. Further, a calculation may be made to find, as the ratio for the estimation of sharpness, the ratio between the pixel value of the pixel in the vertical-direction high frequency/horizontal-direction low frequency image of the low frequency band, which pixel has been found to have a value larger than the predetermined threshold value, and the pixel value of the corresponding pixel in the highest frequency band image, or the ratio between the pixel value of the pixel in the vertical-direction low frequency/horizontal-direction high frequency image of the low frequency band, which pixel has been found to have a value larger than the predetermined threshold value, and the pixel value of the corresponding pixel in the highest frequency band image, whichever ratio has a larger value. In such cases, the sharpness can be estimated without depending upon the directivity of the edge, or the like, contained in the original image.

Also, with the image sharpness estimating method and device in accordance with the present invention, the transform into the multi-resolution space, the comparison with the predetermined threshold value, and the calculation of the ratio may be carried out with respect to only a region selected in the original image. In such cases, the amount of calculations can be kept small, and the estimation of sharpness can be carried out quickly.

Further, with the image sharpness estimating method and device in accordance with the present invention, the transform into the multi-resolution space may be carried out such that the pixels in the images of the plurality of the different frequency bands may not be thinned out. In such cases, the correspondence between the pixels in the low frequency band image and the pixels in the highest frequency band image can be set accurately.

DESCRIPTION OF THE PREFERRED EMBODIMENTS

The present invention will hereinbelow be described in further detail with reference to the accompanying drawings.

Figure 1:
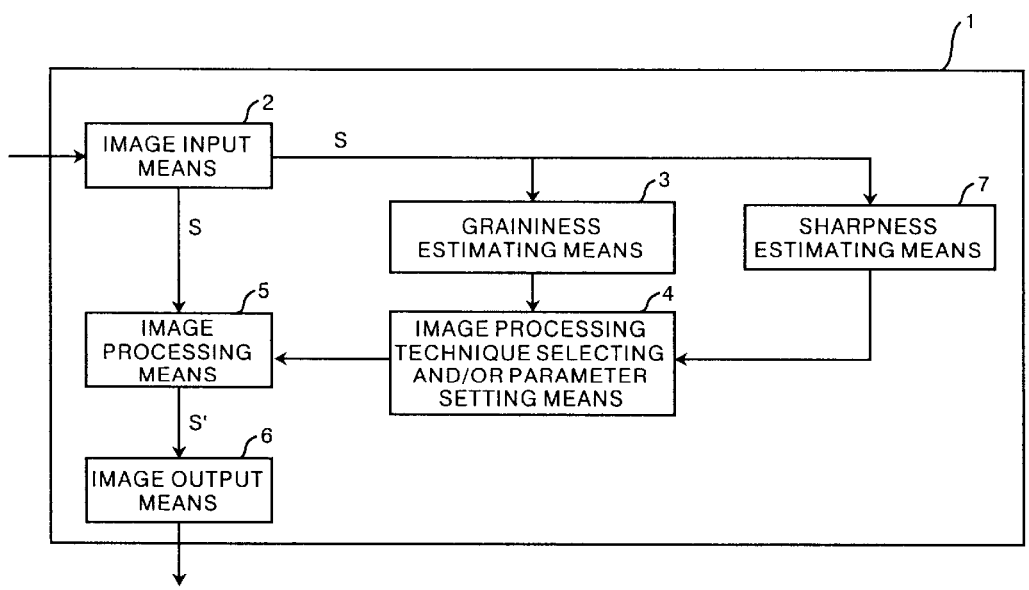
FIG. 1 is a block diagram showing an embodiment of the image processing apparatus in accordance with the present invention.

FIG. 1 is a block diagram showing an embodiment of the image processing apparatus in accordance with the present invention. As illustrated in FIG. 1, an image processing apparatus 1 comprises a graininess estimating means 3 for estimating graininess of an image, which is represented by an original image signal S having been received from an image input means 2. The image processing apparatus 1 also comprises a sharpness estimating means 7 for estimating sharpness of the image, which is represented by the original image signal S having been received from the image input means 2. The image processing apparatus 1 further comprises an image processing technique selecting and/or parameter setting means 4 for selecting an image processing technique and/or setting parameters for image processing in an image processing means 5 in accordance with the graininess, which has been estimated by the graininess estimating means 3, and/or the sharpness, which has been estimated by the sharpness estimating means 7. The image processing apparatus 1 still further comprises the image processing means 5 for carrying out the image processing on the original image signal S and in accordance with the image processing technique and/or the parameters having been set by the image processing technique selecting and/or parameter setting means 4. A processed image signal S' is obtained from the image processing. The image processing apparatus 1 also comprises an image output means 6 for feeding out the processed image signal S' to a printer, a cathode ray tube (CRT) display device, or a network.

Figure 2:
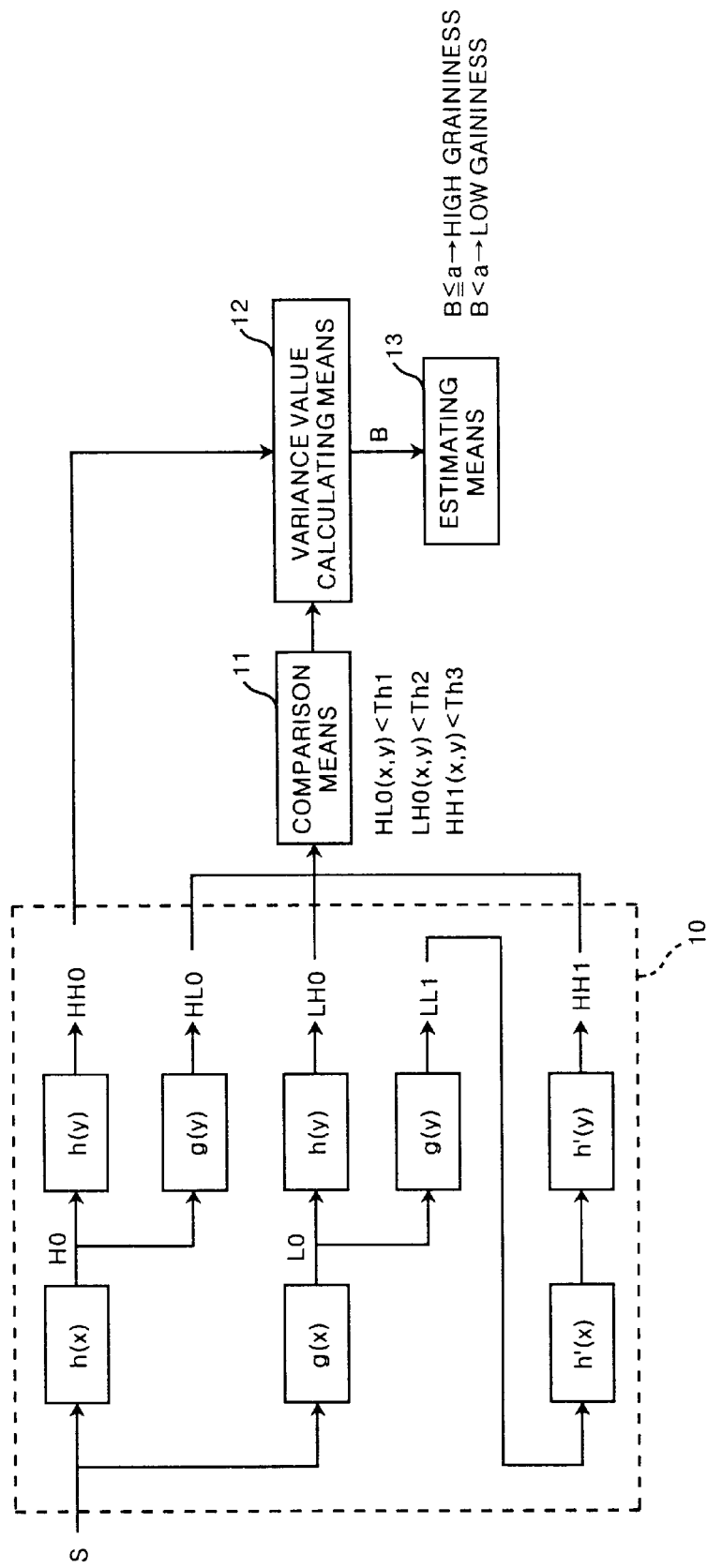
FIG. 2 is a block diagram showing a graininess estimating means in the embodiment of FIG. 1.

FIG. 2 is a block diagram showing the graininess estimating means 3. As illustrated in FIG. 2, the graininess estimating means 3 comprises a wavelet transform means 10 for carrying out wavelet transform on the original image signal S, thereby transforming the original image, which is represented by the original image signal S, into a multi-resolution space, and obtaining image signals representing images, each of which is of one of a plurality of different frequency bands. The graininess estimating means 3 also comprises a comparison means 11 for comparing a pixel value of each of pixels in each of the images represented by image signals HL0, LH0, HH1, which have been obtained from the wavelet transform means 10 (as will be described later), and a predetermined threshold value with each other. The graininess estimating means 3 further comprises a variance value calculating means 12 for calculating a variance value B of pixel values of pixels in the image, which is represented by an image signal HH0, in accordance with the results of comparison made by the comparison means 11. The graininess estimating means 3 still further comprises an estimating means 13 for estimating graininess of the original image, which is represented by the original image signal S, in accordance with the calculated variance value B.

Figure 3:
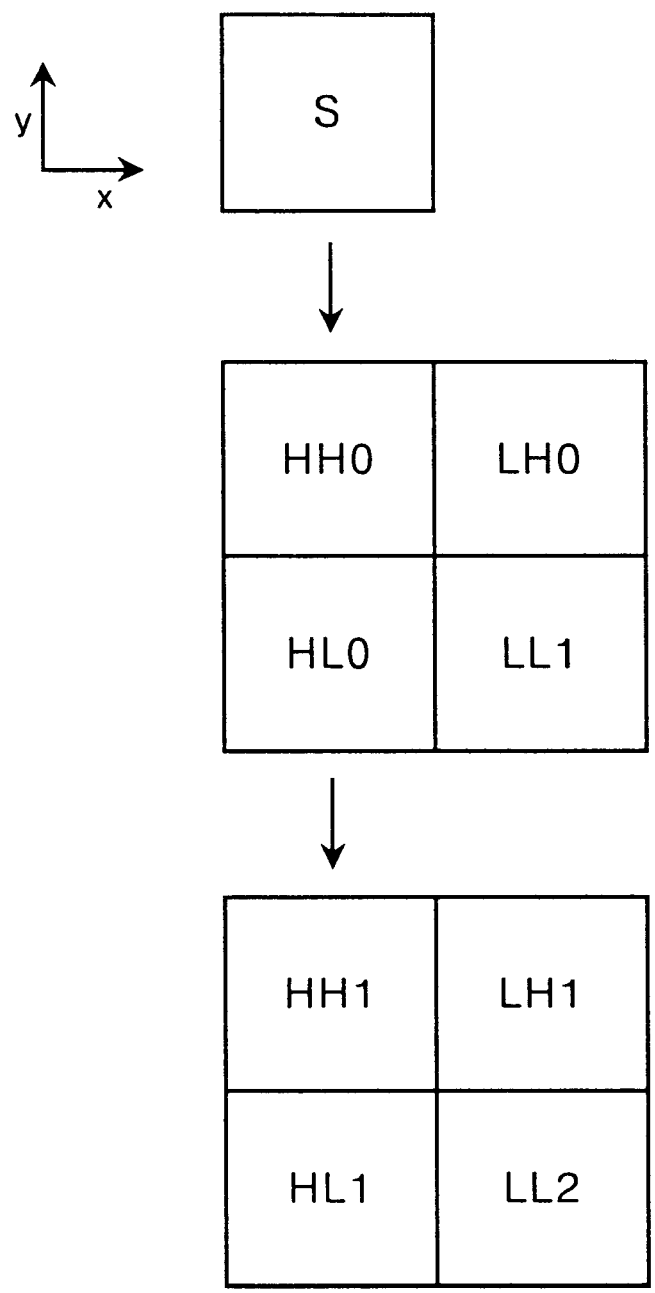
FIG. 3 is an explanatory view showing how wavelet transform is carried out.

In the wavelet transform means 10, the wavelet transform is carried out on the original image signal S in the manner described below. FIG. 3 is an explanatory view showing how the wavelet transform is carried out. In this embodiment, as illustrated in FIG. 3, the horizontal direction in FIG. 3 is taken as the x direction, and the vertical direction is taken as the y direction. In the wavelet transform carried out in this embodiment, the Haar-Wavelet bases shown below are utilized. Also, the thinning-out (sub-sampling) of pixels, which is ordinarily carried out in wavelet transform, is not carried out. Therefore, the multi-resolution images, which are obtained from the wavelet transform, have the same level of resolution as that of the original image.

Haar-Wavelet: $h(x)=-1, 1$ $g(x)=\frac{1}{2}, \frac{1}{2}$ in which h(x) represents the wavelet base for extracting the high frequency components with respect to the x direction, and g(x) represents the wavelet base for extracting the low frequency components with respect to the x direction.

Firstly, a convolutional operation with h(x) is carried out on the original image signal S and along the x direction, and an image signal H0 is thereby obtained. The operation may be represented by the formula shown below.

$$H0(x, y)=h(x)*S(x, y)$$

in which (x, y) represents the spatial coordinates of the pixel.

In the ordinary wavelet transform, when the image signal H0 is obtained, the pixels along the x direction are thinned out such that the number of the pixels may be reduced to one-half. However, in this embodiment, the thinning-out is not carried out.

Thereafter, a convolutional operation with h(y) is carried out on the image signal H0 and along the y direction, and an image signal HH0, which represents an image of the highest frequency band in both of the x direction and the y direction, is thereby obtained. The operation may be represented by the formula shown below.

$$HH0(x, y)=h(y)*H0(x, y)$$

In the same manner as that described above, the image signal HL0 is obtained by carrying out a convolutional operation with g(y) on the image signal H0. Also, the image signal LH0 is obtained by carrying out a convolutional operation with h(y) on an image signal L0, which has been obtained by carrying out a convolutional operation with g(x) on the original image signal S. Further, an image signal LL1 is obtained by carrying out a convolutional operation with g(y) on the image signal L0. The operations may be represented by the formulas shown below.

$$HL0(x, y)=g(y)*H0(x, y)$$

$$L0(x, y)=g(x)*S(x, y)$$

$$LH0(x, y)=h(y)*L0(x, y)$$

$$LL1(x, y)=g(y)*L0(x, y)$$

Further, the Haar-Wavelet base of the next order, which may be represented by the formula:

$h(x)'=-1, 0, 1$ is utilized. A convolutional operation with h(x)' and h(y)' is carried out on the image signal LL1, and the image signal HH1 is thereby obtained. If the pixels were thinned out when the image signal LL1 was obtained, the aforesaid wavelet base represented by $h(x)=-1, 1$ could be utilized. However, in this embodiment, since the pixels have not been thinned out, a value of 0 in a number corresponding to the thinning-out intervals is inserted into the wavelet base. The operation may be represented by the formula shown below.

$$HH1(x, y)=h(y)'*\{h(x)'*LL1(x, y)\}$$

The wavelet transform may then be repeated, and an image signal of a lower frequency band can thereby be obtained. However, in the graininess estimating means 3, only the image signals HH0, HL0, LH0, and HH1 are utilized. Therefore, the operation is finished at this stage. In this embodiment, since the pixels are not thinned out when the wavelet transform is carried out, as illustrated in FIG. 3, the images represented by the image signals HH0, HL0, LH0, LL1 and HH1 have the same level of resolution as that of the original image. The image signal HH0, the image signal HL0, the image signal LH0, and the image signal LL1 represent, respectively, an image of the high frequency in both of the x direction and they direction, an image of the high frequency in the x direction and of the low frequency in they direction, an image of the low frequency in the x direction and of the high frequency in the y direction, and an image of the low frequency in both of the x direction and the y direction, which images are of the highest frequency band of the original image.

In the comparison means 11, the pixel values of the pixels in the images, which are represented by the image signals HL0, LH0, and HH1, are respectively compared with threshold values Th1, Th2, and Th3. Pixels having the coordinates (x, y), which pixels satisfy the three conditions of HL0(x, y)<Th1, LH0(x, y)<Th2, and HH1(x, y)<Th3, are extracted.

The variance value calculating means 12 calculates the variance value B of the pixel values of the pixels in the image represented by the image signal HH0, which pixels correspond to the pixels having the coordinates (x, y) that have been extracted by the comparison means 11. The calculation is made with the formula shown below.

$$B=\Sigma\{HH0(x, y)\}^2/M$$

in which M represents the number of the pixels having been extracted.

In this embodiment, as illustrated in FIG. 3, the image signals HH0, HL0, LH0, LL1, and HH1 have the same level of resolution. Therefore, the correspondence between the pixels having the coordinates (x, y) and the pixels in the image represented by the image signal HH0 can be set accurately and easily.

A boundary line, such as an edge, which is embedded in the original image, has a large pixel value. The pixel value of the boundary line is large also in the image signal HH0, which represents the highest frequency band image, and the image signals HL0, LH0, and HH1, which represent the low frequency band images. Also, as in the boundary line, a grainy component (a noise component) contained in the original image has a large pixel value. The pixel value of the grainy component is large also in the image signal HH0. However, in the image signals HL0, LH0, and HH1, the grainy component, which constitutes a high frequency component of the original image, has been removed, and therefore the pixel value of the pixel corresponding to the grainy component is comparatively small. Therefore, in accordance with the results of comparison made between the pixel values, which are represented by the image signals HL0, LH0, and HH1, and the threshold values Th1, Th2, and Th3, respectively, the pixels in the highest frequency band image, which correspond to the pixels that have been found to have values smaller than the threshold values Th1, Th2, and Th3, are regarded as the pixels having a possibility of containing grainy components. With respect to such pixels in the highest frequency band image, the variance value B of the pixel values is calculated. In cases where grainy components are contained in a flat image area (i.e., an image area at which the signal values are approximately identical with one another), the variance value B becomes large. In cases where little grainy component is contained in the flat image area, the variance value B becomes small.

Accordingly, the estimating means 13 compares the variance value B, which has been calculated by the variance value calculating means 12, and a threshold value "a" with each other. In cases where B≧a, it is estimated that the level of graininess of the original image is high. In cases where B<a, it is estimated that the level of graininess of the original image is low. Information representing the results of the estimation is fed from the estimating means 13 into the image processing technique selecting and/or parameter setting means 4.

Figure 4:
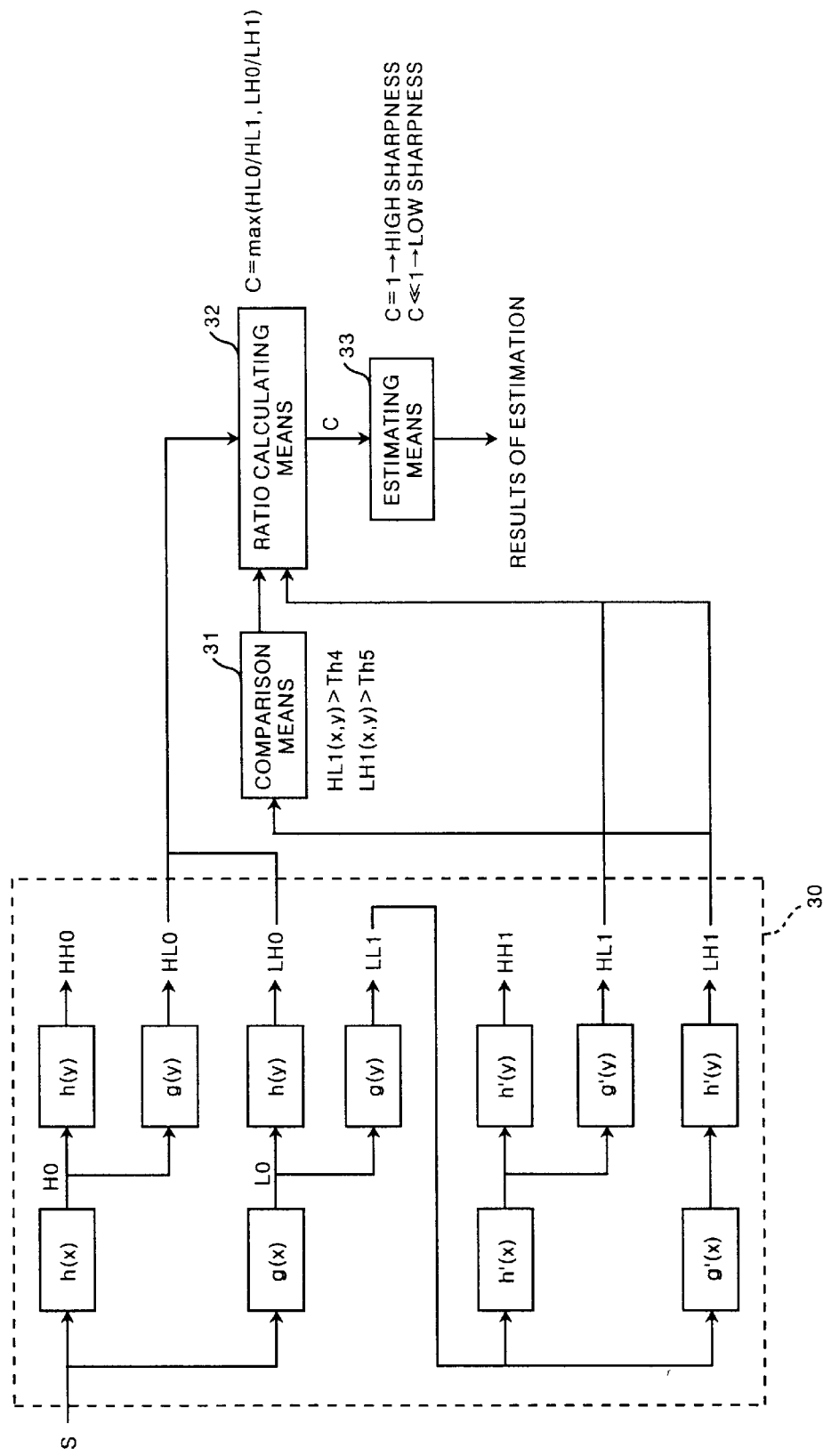
FIG. 4 is a block diagram showing a sharpness estimating means in the embodiment of FIG. 1, FIGS. 5A and 5B are explanatory views showing signal values in the highest frequency band image and a low frequency band image.

FIG. 4 is a block diagram showing the sharpness estimating means 7. As illustrated in FIG. 4, the sharpness estimating means 7 comprises a wavelet transform means 30. As in the wavelet transform means 10 of the graininess estimating means 3, the wavelet transform means 30 carries out the wavelet transform on the original image signal S, and thereby transforms the original image, which is represented by the original image signal S, into a multi-resolution space. In this manner, the wavelet transform means 30 obtains the image signals representing images, each of which is of one of a plurality of different frequency bands. The sharpness estimating means 7 also comprises a comparison means 31 for comparing a pixel value of each of pixels in each of the images represented by the image signals HL1 and LH1, which have been obtained from the wavelet transform means 30 (as will be described later), and a predetermined threshold value with each other. The sharpness estimating means 7 further comprises a ratio calculating means 32 for calculating a ratio C between a pixel value of a pixel in the image, which is represented by the image signal HL1, and the pixel value of the corresponding pixel in the image, which is represented by the image signal HL0, in accordance with the results of comparison made by the comparison means 31. The ratio calculating means 32 also calculates a ratio C between a pixel value of a pixel in the image, which is represented by the image signal LH1, and the pixel value of the corresponding pixel in the image, which is represented by the image signal LH0, in accordance with the results of comparison made by the comparison means 31. The sharpness estimating means 7 still further comprises an estimating means 33 for estimating sharpness of the original image, which is represented by the original image signal S, in accordance with the calculated ratio C.

In the wavelet transform means 30, the wavelet transform is carried out on the original image signal S in the same manner as that in the wavelet transform means 10 of the graininess estimating means 3. However, in the wavelet transform means 30, the wavelet transform is carried out even further on the image signal LL1 in the manner described below.

Specifically, the Haar-Wavelet bases, which are of the order next to the aforesaid Haar-Wavelet bases $h(x)=-1, 1$ and $g(x)=½, ½$ and may be represented by the formulas:

$$h(x)'=-1, 0, 1$$

and $$g(x)'=½, 0, ½$$

are utilized. A convolutional operation with $h(x)'$ and $h(y)'$ is carried out on the image signal LL1, and the image signal HH1 is thereby obtained. Also, a convolutional operation with $h(x)'$ and $g(y)'$ is carried out on the image signal LL1, and the image signal HL1 is thereby obtained. Further, a convolutional operation with $g(x)'$ and $h(y)'$ is carried out on the image signal LL1, and the image signal LH1 is thereby obtained. If the pixels were thinned out when the image signal LL1 was obtained, the aforesaid wavelet bases represented by $h(x)=-1, 1$ and $g(x)=½, ½$ could be utilized. However, in this embodiment, since the pixels have not been thinned out, a value of 0 in a number corresponding to the thinning-out intervals is inserted into the wavelet bases. The operations may be represented by the formulas shown below.

$$HH1(x, y)=h(y)'*\{h(x)'*LL1(x, y)\}$$

$$HL1(x, y)=g(y)'*\{h(x)'*LL1(x, y)\}$$

$$LH1(x, y)=h(y)'*\{g(x)'*LL1(x, y)\}$$

The image signal HH1, the image signal HL1, and the image signal LH1 represent, respectively, an image of the high frequency in both of the x direction and the y direction, an image of the high frequency in the x direction and of the low frequency in the y direction, and an image of the low frequency in the x direction and of the high frequency in the y direction, which images are of the frequency band next to the highest frequency band of the original image.

The wavelet transform may then be repeated, and an image signal of a lower frequency band can thereby be obtained. However, in the sharpness estimating means 7, only the image signals HL0, LH0, HL1, and LH1 are utilized. Therefore, the operation is finished at this stage. In this embodiment, since the pixels are not thinned out when the wavelet transform is carried out, as illustrated in FIG. 3, the images represented by the image signals HH0, HL0, LH0, LL1, HH1, HL1, LH1, and LL2 have the same level of resolution as that of the original image. The image signal LL2 represents an image signal, which is obtained by carrying out a convolutional operation with $g(x)'$ and $g(y)'$ on the image signal LL1.

In the comparison means 31, the pixel values of the pixels in the images, which are represented by the image signals HL1 and LH1, are respectively compared with threshold values Th4 and Th5. Pixels having the coordinates (x, y), which pixels satisfy the two conditions of HL1(x, y)>Th4 and LH1(x, y)>Th5, are extracted.

The ratio calculating means 32 calculates the ratio between the pixel value of each of the pixels having the coordinates (x, y), which have been extracted by the comparison means 31, and the pixel value of the corresponding pixel in the image, which is represented by the image signal HL0, or the ratio between the pixel value of each of the pixels having the coordinates (x, y), which have been extracted by the comparison means 31, and the pixel value of the corresponding pixel in the image, which is represented by the image signal LH0, whichever ratio has a larger value. The calculation is made with the formula shown below.

$$C(x, y)=\max(HL0/HL1, LH0/LH1) \quad (1)$$

In this embodiment, as illustrated in FIG. 3, the image signals HL0, LH0, HL1, and LH1 have the same level of resolution. Therefore, the correspondence between the pixels having the coordinates (x, y) and the pixels in the image represented by each of the image signals HL0 and LH0 can be set accurately and easily.

An image area, such as an edge embedded in the original image, which serves as a reference in the estimation of sharpness of the original image, has a comparatively large pixel value. The pixel value of such an image area is large also in the image signals HL1 and LH1, which represent the low frequency band images. Conversely, if the pixel values of the pixels are small in the image signals HL1 and LH1, which represent the low frequency band images, it can be considered that an image area, such as an edge, which serves as a reference in the estimation of sharpness, is not present at the pixels. Therefore, in accordance with the results of comparison made between the pixel values of the pixels in the low frequency band images and the threshold values Th4, Th5, the pixels in the low frequency band images, which pixels have been found to have values larger than the threshold values Th4, Th5, are regarded as being the pixels serving as a reference in the estimation of sharpness. A calculation is made to find the ratio between the pixel values of the pixels in the low frequency band images, which pixels have been found to have values larger than the threshold values Th4, Th5, and the pixel values of the corresponding pixels in the highest frequency band images, which are represented by the image signals HL0, LH0.

Figure 5A:
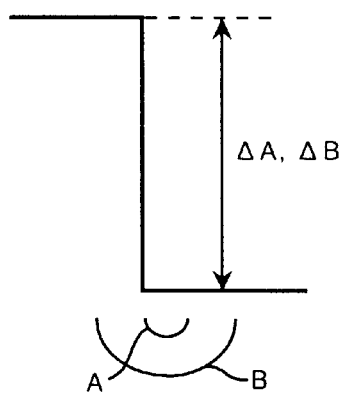
Figure 5B:
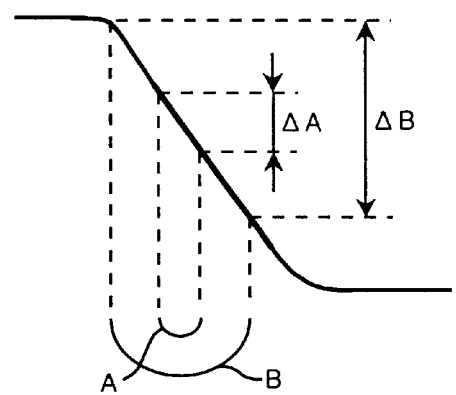

The highest frequency band image carries the highest frequency components of the original image, and therefore represents an amount of change in signal value in a comparatively narrow range. The low frequency band image carries the low frequency components of the original image, and therefore represents an amount of change in signal value in a range wider than in the highest frequency band image. For example, as illustrated in FIG. 5A, at the edge at which the signal value changes sharply, the amount of change in signal value $\Delta A$ in the narrow range A and the amount of change in signal value $\Delta B$ in the wide range B are identical with each other. Also, as illustrated in FIG. 5B, at the image area at which the change in signal value is not sharp, the frequency components are of a frequency band lower than that at the edge at which the signal value changes sharply, and therefore the amount of change in signal value $\Delta B$ in the wide range B becomes larger than the amount of change in signal value $\Delta A$ in the narrow range A. Accordingly, at the edge at which the signal value changes sharply as illustrated in FIG. 5A, the pixel corresponding to the edge area takes an approximately identical pixel value in the highest frequency band image and the low frequency band image. Also, at the image area at which the change in signal value is not sharp as illustrated in FIG. 5B, the pixel corresponding to the signal change position takes a larger pixel value in the low frequency band image than in the highest frequency band image.

Therefore, the ratio C of the pixel value of the pixel in the highest frequency band image to the pixel value of the corresponding pixel in the low frequency band image takes a value close to 1 at the edge at which the signal value changes sharply, i.e. at the image area having a high level of sharpness. Also, the ratio takes a value smaller than 1 at the image area at which the change in signal value is not sharp, i.e. at the image area having a low level of sharpness.

Accordingly, the estimating means 33 compares the ratio C, which has been calculated by the ratio calculating means 32, and a value of 1 with each other. In cases where C=1 (or C is close to 1), it is estimated that the image area has a high level of sharpness. In cases where C<<1, it is estimated that the image area has a low level of sharpness. Information representing the results of the estimation is fed from the estimating means 33 into the image processing technique selecting and/or parameter setting means 4.

The image processing technique selecting and/or parameter setting means 4 selects an image processing technique and/or sets the parameters in accordance with the graininess of the original image, which has been estimated by the graininess estimating means 3, and/or the sharpness of the original image, which has been estimated by the sharpness estimating means 7. Specifically, in cases where it has been estimated that the level of graininess is high, a smoothing process for reducing the graininess is selected. Alternatively, in such cases, when the size of the original image is to be enlarged or reduced, the B spline interpolating operation process, which attaches importance to smoothness, is selected, and the parameters for the B spline interpolating operation process are determined. In cases where it has been estimated that the level of graininess is low, no smoothing process is carried out on the original image signal. Alternatively, in such cases, when the size of the original image is to be enlarged or reduced, the cubic spline interpolating operation process, which attaches importance to sharpness, is selected.

How the cubic spline interpolating operation process and the B spline interpolating operation process are carried out will be described hereinbelow. The original image signal S used in this embodiment is made up of a series of digital image signal components $S_{k-2}$, $S_{k-1}$, $S_k$, $S_{k+1}$, $S_{k+2}$, ... respectively corresponding to sampling points (picture elements) $X_{k-2}$, $X_{k-1}$, $X_k$, $X_{k+1}$, $X_{k+2}$, ..., which are sampled with a period of an equal interval and arrayed in one direction.

In the cubic spline interpolating operation process, calculations are made to find interpolation coefficients $c_{k-1}$, $c_k$, $c_{k+1}$, and $c_{k+2}$, which respectively correspond to the original image signal components $Y_{k-1}$, $Y_k$, $Y_{k+1}$, and $Y_{k+2}$, in Formula (2) shown below. Formula (2) serves as a third-order cubic spline interpolating operation formula and represents an interpolated signal component Y' corresponding to an interpolation point $X_p$, which is located between original sampling points (picture elements) $X_k$ and $X_{k+1}$. The calculations are made with the formulas shown below.

$$Y'=c_{k-1}Y_{k-1}+c_kY_k+c_{k+1}Y_{k+1}+c_{k+2}Y_{k+2}$$

$$c_{k-1}=(-t^3+2t^2-t)/2$$

$$c_k=(3t^3-5t^2+2)/2$$

$$c_{k+1}=(-3t^3+4t^2+t)/2$$

$$c_{k+2}=(t^3-t^2)/2 \qquad (2)$$

in which t, where $0 \leq t \leq 1$, represents the position of the interpolation point $X_p$, the position being taken with respect to the picture element $X_k$ that serves as a reference position, and in the direction heading toward the picture element $X_{k+1}$, the lattice interval being set to be equal to 1.

In the B spline interpolating operation process, calculations are made to find interpolation coefficients $b_{k-1}$, $b_k$, $b_{k+1}$, and $b_{k+2}$, which respectively correspond to the original image signal components $Y_{k-1}$, $Y_k$, $Y_{k+1}$, and $Y_{k+2}$, in Formula (3) shown below. Formula (3) serves as a third-order B spline interpolating operation formula and represents an interpolated signal component Y' corresponding to the interpolation point $X_p$, which is located between the original sampling points $X_k$ and $X_{k+1}$. The calculations are made with the formulas shown below.

$$Y'=b_{k-1}Y_{k-1}+b_kY_k+b_{k+1}Y_{k+1}+b_{k+2}Y_{k+2}$$

$$b_{k-1}=(-t^3+3t^2-3t+1)/6$$

$$b_k=(3t^3-6t^2+4)/6$$

$$b_{k+1}=(-3t^3+3t^2+3t+1)/6$$

$$b_{k+2}=(t^3)/6 \qquad (3)$$

in which t, where $0 \leq t \leq 1$, represents the position of the interpolation point $X_p$, the position being taken with respect to the picture element $X_k$ that serves as a reference position, and in the direction heading toward the picture element $X_{k+1}$, the lattice interval being set to be equal to 1.

In the image processing technique selecting and/or parameter setting means 4, the interpolation coefficients $c_{k-1}$, $c_k$, $c_{k+1}$, and $c_{k+2}$ or the interpolation coefficients $b_{k-1}$, $b_k$, $b_{k+1}$, and $b_{k+2}$ are set as the parameters.

As for the sharpness, the values of the enhancement coefficient Sk(x, y) in an unsharp masking process, which may be represented by Formula (4) shown below, are set as the parameters in accordance with the results of estimation of sharpness of the original image, which estimation has been carried out by the sharpness estimating means 7, i.e. in accordance with the estimated level of the sharpness.

$$S'(x, y)=S(x, y)+Sk(x, y)\times\{S(x, y)-Sus(x, y)\} \quad (4)$$

in which S'(x, y) represents the processed image signal, and Sus(x, y) represents the image signal having been obtained by blurring the image signal S(x, y) with a mask having a size of 5 pixels×5 pixels.

Figure 6:
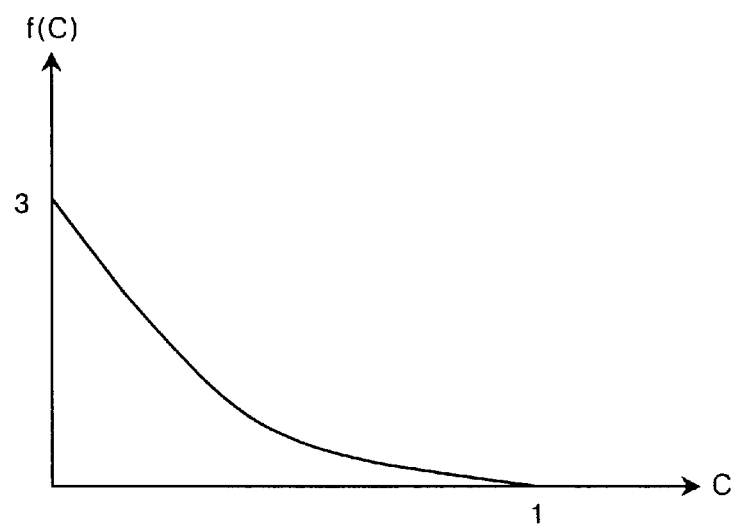
FIG. 6 is a graph showing a function for setting an enhancement coefficient Sk.

As illustrated in FIG. 6, a function f(C) is set such that it may take a value of 0 when C(x, y)=1, a value of 1 when C(x, y)=0.5, and a value of 3 when C(x, y)=0. Also, the enhancement coefficient Sk(x, y) for sharpness is calculated with the formula Sk(x, y)=f(C). Pixels having the coordinates (x, y), which pixels have not been extracted in the comparison with the aforesaid threshold values Th4 and Th5, are the ones located in a flat image region (i.e., an image region at which the signal values are approximately identical with one another), which cannot serve as a reference for estimation of sharpness. For such pixels, sharpness enhancement is not necessary, and therefore it may be set such that Sk(x, y)=0.

In such cases, the problems should preferably be prevented from occurring in that the image becomes discontinuous between the region (hereinbelow referred to as the extracted region) of the pixels, which have been extracted in the comparison with the aforesaid threshold values Th4 and Th5, and the region (hereinbelow referred to as the un-extracted region) of the pixels, which have not been extracted in the comparison with the aforesaid threshold values Th4 and Th5. For such purposes, with respect to the un-extracted region, in cases where the extracted region is located within a predetermined distance δ from the un-extracted region, the enhancement coefficient Sk(x, y) should preferably be set with Formula (5) shown below and in accordance with an enhancement coefficient Sk(x1, y1), which is set for the extracted region closest to the un-extracted region, and a distance Δ between the un-extracted region and the extracted region.

$$Sk(x, y)=Sk(x1, y1)\times\{(\delta-\Delta)/\delta\} \quad (5)$$

Also, in cases where it has been estimated that the level of sharpness is high, when the size of the original image is to be enlarged or reduced, the image processing technique selecting and/or parameter setting means 4 selects the B spline interpolating operation process, which attaches importance to smoothness, and determines the parameters for the B spline interpolating operation process. In cases where it has been estimated that the level of sharpness is low, when the size of the original image is to be enlarged or reduced, the image processing technique selecting and/or parameter setting means 4 selects the cubic spline interpolating operation process, which attaches importance to sharpness.

The image processing means 5 carries out the image processing and/or the interpolating operation on the original image signal S and in accordance with the image processing technique and/or the parameters, which have been set by the image processing technique selecting and/or parameter setting means 4. In this manner, the processed image signal S' is obtained.

How this embodiment of the image processing apparatus operates will be described hereinbelow. The original image signal S, which has been fed from the image input means 2, is fed into the graininess estimating means 3 and/or the sharpness estimating means 7. In the graininess estimating means 3, the original image signal S is decomposed with the wavelet transform into the image signals representing the images, each of which is of one of the plurality of the different frequency bands. In the manner described above, the variance value B of the image signal HH0, which represents the highest frequency band image, is calculated, and the graininess of the original image is estimated. In the sharpness estimating means 7, as in the graininess estimating means 3, the original image signal S is decomposed with the wavelet transform into the image signals representing the images, each of which is of one of the plurality of the different frequency bands. Also, the ratio C is calculated with Formula (1) shown above, and the sharpness of the original image is estimated.

The image processing technique selecting and/or parameter setting means 4 selects the image processing technique, which is to be carried out on the original image signal S by the image processing means 5, in accordance with the graininess having been estimated by the graininess estimating means 3. Alternatively, in cases where the size of the original image is to be enlarged or reduced, the image processing technique selecting and/or parameter setting means 4 selects the kind of the interpolating operation and sets the parameters for the interpolating operation. Also, the image processing technique selecting and/or parameter setting means 4 sets the enhancement coefficients Sk(x, y) in the unsharp masking process, which is to be carried out on the original image signal S by the image processing means 5, in accordance with the sharpness having been estimated by the sharpness estimating means 7. Alternatively, in cases where the size of the original image is to be enlarged or reduced, the image processing technique selecting and/or parameter setting means 4 selects the kind of the interpolating operation and sets the parameters for the interpolating operation.

The image processing means 5 carries out the image processing technique and/or the interpolating operation, which has been selected by the image processing technique selecting and/or parameter setting means 4, on the original image signal S and thereby obtains the processed image signal S'. The processed image signal S' is fed from the image output means 6 into a printer, a CRT display device, or the like, and used for reproducing a visible image. Alternatively, the processed image signal S' is transferred to a network.

As described above, with this embodiment of the image processing apparatus, the graininess and/or the sharpness of the original image is estimated from the original image signal S, which represents the original image. Therefore, in the image processing means 5, by utilizing the results of estimation, the image processing, such as the smoothing process or the unsharp masking process, and/or the interpolating operation can be carried out on the original image signal S and in accordance with the estimated graininess and/or the estimated sharpness of the original image. Accordingly, even if it is not clear which image signal representing an original image is the one having been obtained from which image input apparatus, and even if it is not clear whether the received image signal has or has not been subjected to image processing, the image processing with respect to graininess and/or sharpness, which image processing is optimum for the original image, can be carried out.

Further, the transform into the multi-resolution space is carried out by repeating the convolutional operation along each of the x and y directions in the original image and with the wavelet bases h(x) and g(x). Also, with respect to the x-direction high frequency/y-direction low frequency image (represented by the image signal HL1) and the x-direction low frequency/y-direction high frequency image (represented by the image signal LH1), which are of the low frequency band, the comparison between the pixel values of the pixels and the threshold values Th4, Th5 are carried out. Further, the aforesaid ratios are calculated with respect to the x-direction high frequency/y-direction low frequency image (represented by the image signal HL0) and the x-direction low frequency/y-direction high frequency image (represented by the image signal LH0). Of the calculated ratios, the ratio having a larger value than the other ratio is taken as the ratio C for the estimation of the sharpness. Therefore, the sharpness can be estimated without depending upon the directivity of the edge, or the like, contained in the original image.

An embodiment of the image composing system in accordance with the present invention will be described hereinbelow.

Figure 7:
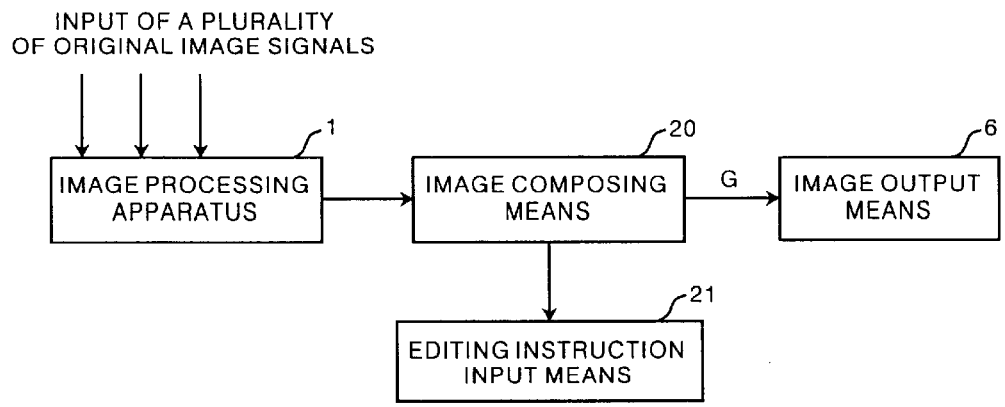
FIG. 7 is a block diagram showing an embodiment of the image composing system in accordance with the present invention.

FIG. 7 is a block diagram showing an embodiment of the image composing system in accordance with the present invention, wherein the image processing apparatus 1 shown in FIG. 1 is employed. As illustrated in FIG. 7, in this embodiment of the image composing system, a plurality of original image signals S, S, . . . are fed into the image processing apparatus 1. In the same manner as that in the embodiment of the image processing apparatus described above, the optimum image processing is carried out on each of the original image signals S, S, . . . Also, in an image composing means 20, the processed image signals S', S', . . . having been obtained from the image processing are combined with one another in accordance with an instruction given from an editing instruction input means 21. In this manner, a composed image signal G is obtained. The composed image signal G is fed from the image output means 6 into a printer, or the like.

In this manner, when the plurality of the original images are combined with one another, the graininess and/or the sharpness of each of the original image signals S, S, . . . is estimated with the image processing apparatus in accordance with the present invention. Also, in the same manner as that in the aforesaid embodiment of the image processing apparatus, the image processing is carried out on each of the original image signals S, S, . . . and in accordance with the estimated graininess and/or the estimated sharpness. In this manner, the processed image signals S', S', . . . can be obtained, which have been subjected to optimum image processing with respect to the graininess and/or the sharpness. In cases where it has been estimated that the level of graininess of the original image, which is represented by an original image signal S having been fed into the image processing apparatus 1, is high, image processing, such as the smoothing process, for reducing the graininess is carried out. Alternatively, in such cases, when the size of the original image is to be enlarged or reduced, the B spline interpolating operation process described above is carried out. In cases where it has been estimated that the level of graininess of the original image is low, no smoothing process is carried out. Alternatively, in such cases, when the size of the original image is to be enlarged or reduced, the cubic spline interpolating operation process described above is carried out. Also, with respect to an image area in the original image represented by an original image signal S having been fed into the image processing apparatus 1, which image area has been estimated as having a high level of sharpness, processing is carried out such that the sharpness may be less enhanced. With respect to an image area in the original image, which image area has been estimated as having a low level of sharpness, processing is carried out such that the sharpness may be more enhanced. Further, in cases where it has been estimated that the level of sharpness is high in the entire area of the original image and image size enlargement or reduction is to be carried out, the B spline interpolating operation process, which attaches importance to smoothness, can be carried out on the original image signal. In cases where it has been estimated that the level of sharpness is low in the entire area of the original image and image size enlargement or reduction is to be carried out, the cubic spline interpolating operation process, which attaches importance to sharpness, can be carried out on the original image signal.

Therefore, each of the images represented by the processed image signals S', S', . . . can be obtained such that the graininess and/or the sharpness may have been corrected appropriately. A visible image is then reproduced from the composed image signal G, which has been obtained from the processed image signals S', S', . . . by the image composing means 20. Accordingly, the problems can be prevented from occurring in that, in cases where the same image processing is carried out on all of the original image signals to be combined, an image is obtained, in which the balance of graininess or sharpness varies for different areas of the image. As a result, a composed image can be obtained, which gives a natural feeling.

In the aforesaid embodiment of the image composing system, the instruction specified fro the editing instruction input means 21 is fed into the image composing means 20. Alternatively, the instruction may also be fed into the image processing apparatus 1, and the image processing may be carried out with respect to only a specified region in the image.

In the embodiments described above, the wavelet transform is carried out with respect to all of the pixels in the image represented by the original image signal S. Alternatively, the wavelet transform may be carried out with respect to only the center region of the original image, which region has a high possibility of containing a major object pattern, or only an arbitrarily selected region in the image. The time required to carry out the operations may thereby be kept short.

Also, in the embodiments described above, when the wavelet transform is carried out, the pixels are not thinned out. Alternatively, the wavelet transform may be carried out such that the pixels may be thinned out, and such that an image having a reduced size may be obtained with respect to a low frequency band.

Further, in the embodiments described above, the wavelet transform is utilized for transforming the original image into the multi-resolution space. Alternatively, the Laplacian pyramid technique or the Fourier transform technique may be employed for such purposes.

Furthermore, in the embodiments described above, in the comparison means 11, the image signals HL0, LH0, and HH1, which are of the frequency band lower by one stage than the image signal HH0 representing the highest frequency band image, are compared with the threshold values Th1, Th2, and Th3. Alternatively, image signals representing images of a frequency band, which is low even further, may be obtained with the wavelet transform means 10 and compared with the threshold values Th1, Th2, and Th3.

Also, in the embodiments described above, in the comparison means 31, the image signals HL1 and LH1, which are of the frequency band lower by one stage than the image signals HL0 and LH0 that represent the highest frequency band images, are compared with the threshold values Th4 and Th5. Alternatively, image signals representing images of a frequency band, which is low even further, may be obtained with the wavelet transform means 30 and compared with the threshold values Th4 and Th5.

Further, in the embodiments described above, the graininess estimating means 3 and the sharpness estimating means 7 are respectively provided with the wavelet transform means 10 and the wavelet transform means 30. Alternatively, only one wavelet transform means may be provided, and the output obtained from the wavelet transform means may be utilized in both of the graininess estimating means 3 and the sharpness estimating means 7.

The graininess estimation carried out by the graininess estimating means 3 and the sharpness estimation carried out by the sharpness estimating means 7 are not limited to the use of technique utilizing the wavelet transform and may be carried out with one of various other techniques.

Figure 8:
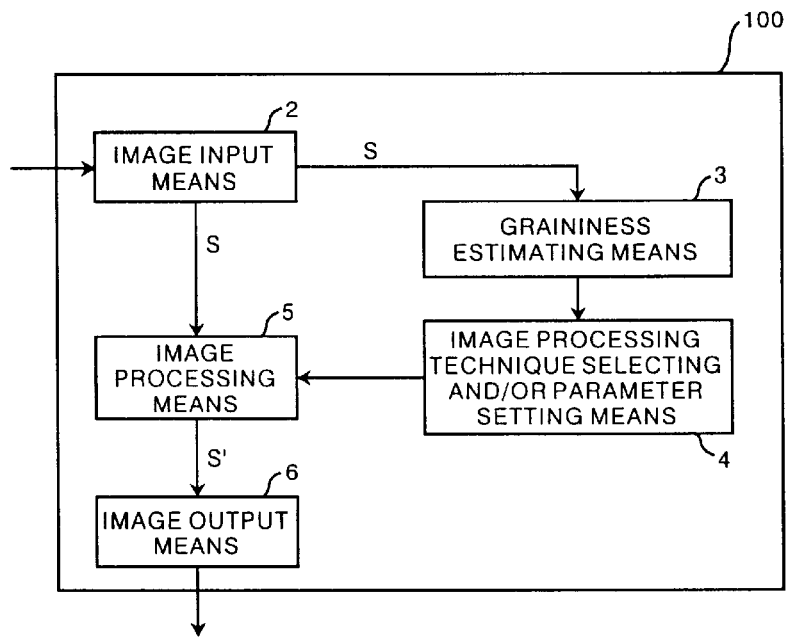
FIG. 8 is a block diagram showing an image processing apparatus, in which an embodiment of the image graininess estimating device in accordance with the present invention is employed.
Figure 9:
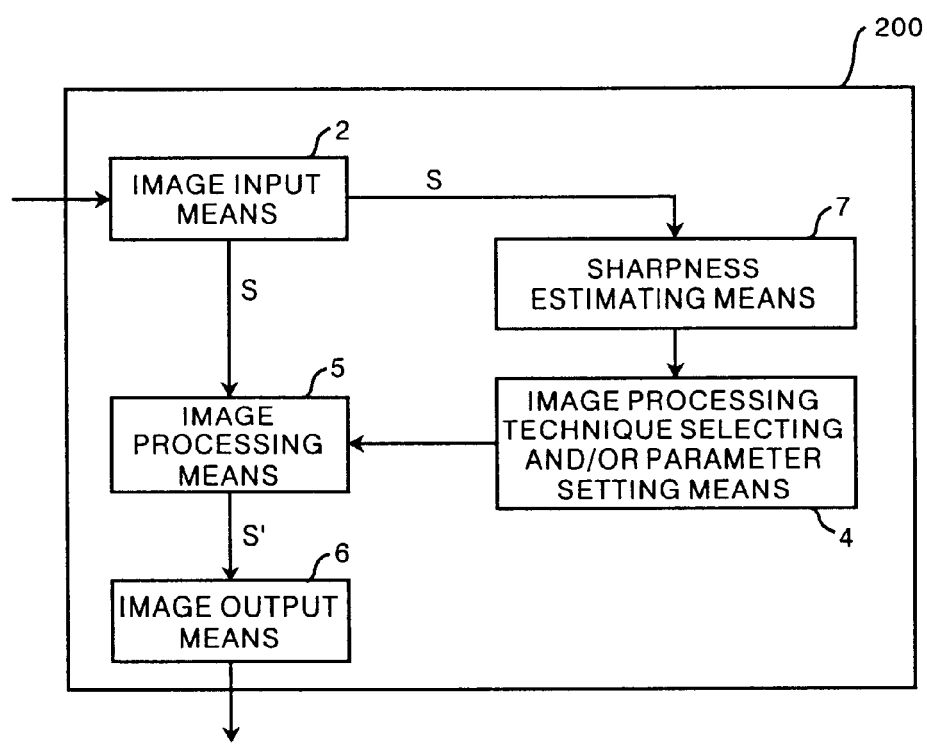
FIG. 9 is a block diagram showing an image processing apparatus, in which an embodiment of the image sharpness estimating device in accordance with the present invention is employed.

The image processing apparatus 1 shown in FIG. 1 is provided with both of the graininess estimating means 3 and the sharpness estimating means 7 as the estimating means. Alternatively, as illustrated in FIG. 8, an image processing apparatus 100 may be provided with only the graininess estimating means 3 as the estimating means. Also, as illustrated in FIG. 9, an image processing apparatus 200 may be provided with only the sharpness estimating means 7 as the estimating means. In FIGS. 8 and 9, similar elements are numbered with the same reference numerals with respect to FIG. 1.

In the image processing apparatus 100 shown in FIG. 8, the graininess estimating means 3 constitutes an embodiment of the image graininess estimating device in accordance with the present invention. In the image processing apparatus 200 shown in FIG. 9, the sharpness estimating means 7 constitutes an embodiment of the image sharpness estimating device in accordance with the present invention.

As in the image processing apparatus 1 described above, each of the image processing apparatus 100 shown in FIG. 8 and the image processing apparatus 200 shown in FIG. 9 is applicable to the image composing system shown in FIG. 7.

What is claimed is:

1. An image processing method, wherein image processing is carried out on an original image signal representing an original image, the method comprising the steps of:
    i) estimating graininess of the original image in accordance with the original image signal, and
    ii) carrying out the image processing on the original image signal in accordance with the graininess having been estimated, a processed image signal being thereby obtained,
    wherein the image processing is one of interpolating operation processes, which yield interpolation images having different levels of sharpness and each of which is set in accordance with the graininess having been estimated.

2. An image composing method, wherein a plurality of original image signals representing a plurality of images are combined with one another, and a composed image signal is thereby obtained, the method comprising the steps of:
    i) carrying out image processing on each of the original image signals and with an image processing method as defined in claim 1, a plurality of processed image signals being thereby obtained, and
    ii) combining the plurality of the processed image signals, the composed image signal being thereby obtained.

3. An image processing apparatus, wherein image processing is carried out on an original image signal representing an original image, the apparatus comprising:
    i) an estimating means for estimating graininess of the original image in accordance with the original image signal, and
    ii) an image processing means for carrying out the image processing on the original image signal in accordance with the graininess having been estimated, and thereby obtaining a processed image signal,
    wherein the image processing, which is carried out by said image processing means, is one of interpolating operation processes, which yield interpolation images having different levels of sharpness and each of which is set in accordance with the graininess having been estimated.

4. An image composing system, wherein a plurality of original image signals representing a plurality of images are combined with one another, and a composed image signal is thereby obtained, the system comprising:
    i) means for carrying out image processing on each of the original image signals and with an image processing apparatus as defined in claim 3 and thereby obtaining a plurality of processed image signals, and
    ii) an image composing means for combining the plurality of the processed image signals, and thereby obtaining the composed image signal.

5. An image processing method, wherein image processing is carried out on an original image signal representing an original image, the method comprising the steps of:
    i) estimating graininess and sharpness of the original image in accordance with the original image signal, and
    ii) carrying out the image processing on the original image signal and in accordance with the graininess and the sharpness having been estimated, a processed image signal being thereby obtained,
    wherein the image processing is one of interpolating operation processes, which yield interpolation images having different levels of sharpness and each of which is set in accordance with the graininess having been estimated.

6. An image processing apparatus, wherein image processing is carried out on an original image signal representing an original image, the apparatus comprising:
    i) an estimating means for estimating graininess and sharpness of the original image in accordance with the original image signal, and
    ii) an image processing means for carrying out the image processing on the original image signal and in accordance with the graininess and the sharpness having been estimated, and thereby obtaining a processed image signal,
    wherein the image processing, which is carried out by said image processing means, is one of interpolating operation processes, which yield interpolation images having different levels of sharpness and each of which is set in accordance with the graininess having been estimated.

* * * * *